US009660375B2

(12) United States Patent
Mano

(10) Patent No.: US 9,660,375 B2
(45) Date of Patent: May 23, 2017

(54) ANTI-CORROSIVE MATERIAL, WIRE WITH TERMINAL, AND WIRE HARNESS

(71) Applicant: YAZAKI CORPORATION, Tokyo (JP)

(72) Inventor: Kazuki Mano, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/132,348

(22) Filed: Apr. 19, 2016

(65) Prior Publication Data
US 2016/0308301 A1 Oct. 20, 2016

(30) Foreign Application Priority Data

Apr. 20, 2015 (JP) ................ 2015-085670

(51) Int. Cl.
H01R 13/52 (2006.01)
C08F 220/68 (2006.01)
C08F 2/48 (2006.01)
C08F 222/10 (2006.01)
H01R 4/18 (2006.01)

(52) U.S. Cl.
CPC .......... *H01R 13/5216* (2013.01); *C08F 2/48* (2013.01); *C08F 220/68* (2013.01); *C08F 222/1006* (2013.01); *H01R 4/185* (2013.01)

(58) Field of Classification Search
CPC ................ H01R 13/5221; H01R 13/5216
See application file for complete search history.

(56) References Cited

U.S. PATENT DOCUMENTS

2012/0205151 A1* 8/2012 Inoue .................. C09D 5/082
174/72 A
2013/0032394 A1* 2/2013 Inoue .................. C09D 5/08
174/74 R
2013/0052887 A1* 2/2013 Inoue .................. H01R 4/62
439/877

(Continued)

FOREIGN PATENT DOCUMENTS

JP  2011-103266 A  5/2011
JP  2011-256429 A  12/2011
JP  2013-080682 A  5/2013

OTHER PUBLICATIONS

Official action issued on Apr. 11, 2017 in the counterpart Japanese patent application.

Primary Examiner — James Harvey
(74) Attorney, Agent, or Firm — Mots Law, PLLC

(57) ABSTRACT

An anti-corrosive material includes: an ultraviolet curable resin including a polymerizable compound as a main component, the polymerizable compound composed of at least one of a photopolymerizable (meth)acrylate monomer and a photopolymerizable (meth)acrylate oligomer. The polymerizable compound is composed of a combination of a monofunctional (meth)acrylate monomer and a bifunctional (meth)acrylate monomer, or a combination of at least one of a monofunctional (meth)acrylate monomer and a bifunctional (meth)acrylate monomer and at least one of a trifunctional (meth)acrylate monomer and a polyfunctional (meth) acrylate monomer having four or more functional groups. The anti-corrosive material has a viscosity at 25° C. of 18900 mPa·s or less measured according to JIS Z8803.

19 Claims, 3 Drawing Sheets

(56) References Cited

U.S. PATENT DOCUMENTS

| | | | |
|---|---|---|---|
| 2013/0062114 A1* | 3/2013 | Inoue | C09D 4/00 174/72 A |
| 2015/0021090 A1* | 1/2015 | Mano | H01R 4/185 174/72 A |
| 2015/0140857 A1* | 5/2015 | Sato | H01R 4/185 439/523 |
| 2015/0368389 A1* | 12/2015 | Tanaka | C09D 4/06 174/72 A |
| 2016/0308301 A1* | 10/2016 | Mano | H01R 13/5216 |

* cited by examiner

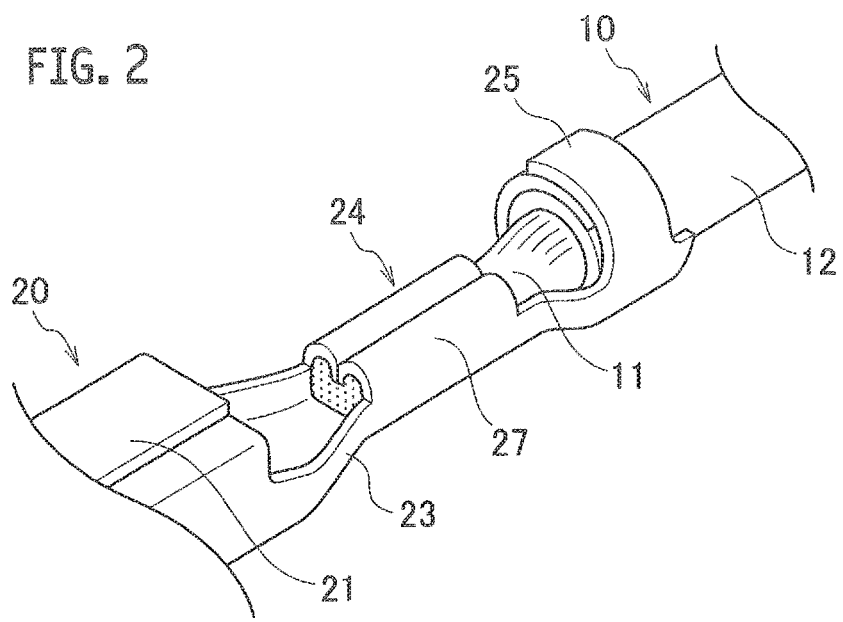
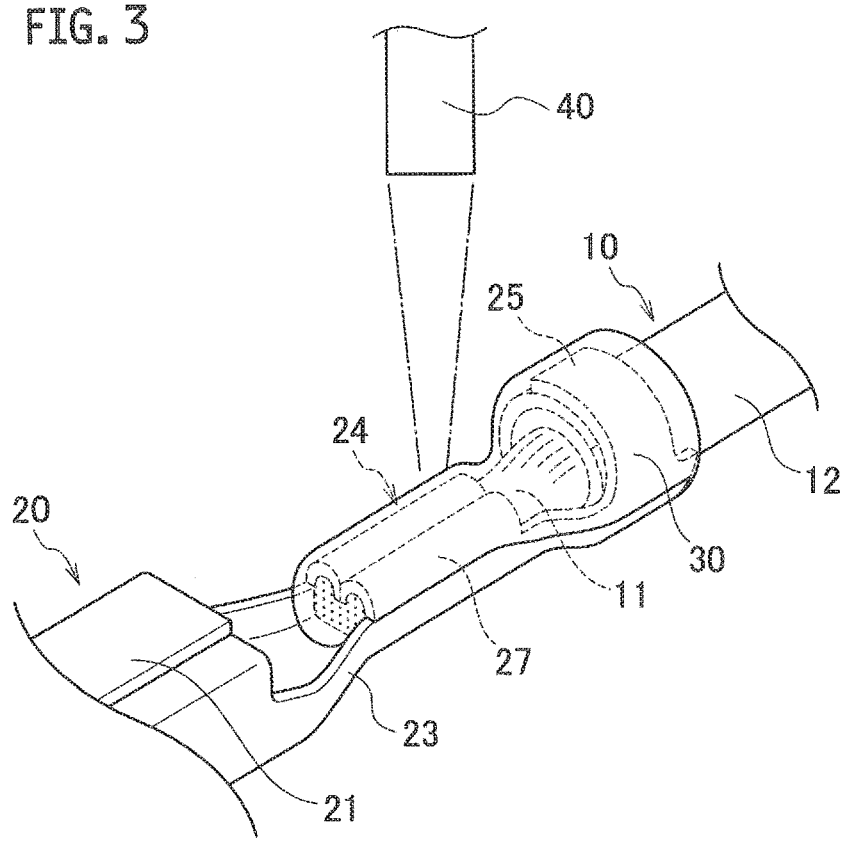

ANTI-CORROSIVE MATERIAL, WIRE WITH TERMINAL, AND WIRE HARNESS

CROSS REFERENCE TO RELATED APPLICATION

This application is based upon and claims the benefit of priority from the prior Japanese Patent Application No. 2015-085670, filed on Apr. 20, 2015, the entire contents of which are incorporated herein by reference.

BACKGROUND

1. Technical Field

The present invention relates to an anti-corrosive material, a wire with a terminal, and a wire harness. More specifically, the present invention relates to an anti-corrosive material, a wire with a terminal including a sealing member formed by curing the anti-corrosive material, and a wire harness including the wire with a terminal.

2. Related Art

Use of aluminum wires in coated wires for wire harnesses has been increasing to reduce the weights of vehicles, and thus increase the fuel efficiency of the vehicles. Metal terminals to be connected to aluminum wires are usually formed of copper or copper alloys having excellent electrical properties. Such a difference in material between the conductor of the coated wires and the metal terminal readily leads to corrosion of the joint connecting the conductor and the metal terminals. An anti-corrosive material is thus required to prevent corrosion of the joints.

In the related art, a coated wire with a terminal is disclosed that uses an anti-corrosive material containing a thermoplastic polyamide resin as a main component, and having a tensile lap-shear strength of 6 N/mm² or more for a bundle of aluminum wires, an elongation rate of 100% or more, and a moisture absorbing rate of 1.0% or less (for example, see Japanese Unexamined Patent Application Publication No. 2011-103266).

In addition, there is disclosed a technique of providing a female crimp terminal having a crimp portion to be crimped to a wire exposed portion of a coated wire including aluminum core wires, the crimp portion includes a highly functional scaling member formed of an organic material and having a predetermined compression set or hardness (for example, see Japanese Unexamined Patent Application Publication No. 2013-80682). There is also disclosed crimping of a barrel piece of the crimp portion so as to continuously and integrally surround the wire from the leading end of the exposed portion of the coated wire through the leading end of an insulation coating to a region posterior to the leading end of the insulating coating.

In Japanese Unexamined Patent Application Publication No. 2011-103266, the joint between the metal terminal and the wire is covered with a predetermined anti-corrosive material to prevent corrosion of the joint. Unfortunately, the entire joint should be covered with an anti-corrosive material having a sufficient thickness to ensure sufficient anti-corrosive performance, although such an anti-corrosive material applied in a large amount sometimes results in an excessively increased dimension of the anti-corrosive material as compared to the dimension of the joint. For this reason, the anti-corrosive material cannot be inserted into the cavity of a connector housing during accommodation of the metal terminal in the connector housing in some cases. Such application of the anti-corrosive material in a large amount causes a need to increase the dimension of the opening of the cavity of the connector housing, leading to a change in design of the connector housing. In this case, existing connector housings cannot be used.

In Japanese Unexamined Patent Application Publication No. 2013-80682, a wire exposed portion of the coated wire is crimped with two barrel pieces. Unfortunately, invasion of water from the gap between the barrel pieces cannot be sufficiently prevented even with a sealing member disposed over the barrel pieces, so that corrosion may be generated.

The present invention has been made in consideration of these problems of the conventional techniques. An object of the present invention is to provide an anti-corrosive material which can prevent corrosion of joints connecting metal terminals and wires for a long time while preventing an increase in the outer dimensions of the joints, a wire with a terminal including the anti-corrosive material, and a wire harness including the wire.

SUMMARY

An anti-corrosive material according to a first embodiment of the present invention includes: an ultraviolet curable resin including a polymerizable compound as a main component, the polymerizable compound being composed of at least one of a photopolymerizable (meth)acrylate monomer and a photopolymerizable (meth)acrylate oligomer. The polymerizable compound is composed of a combination of a monofunctional (meth)acrylate monomer and a bifunctional (meth)acrylate monomer, or a combination of at least one of a monofunctional (meth)acrylate monomer and a bifunctional (meth)acrylate monomer and at least one of a trifunctional (meth)acrylate monomer and a polyfunctional (meth)acrylate monomer having four or more functional groups. The anti-corrosive material has a viscosity at 25° C. of 18900 mPa·s or less, which is measured according to JIS Z8803.

A wire with a terminal according to a second embodiment of the present invention includes a wire including: a conductor and a wire covering member disposed over the conductor; a metal terminal connected to the conductor of the wire; and a sealing member formed by curing the anti-corrosive material according to the first embodiment and covering a joint connecting the conductor and the metal terminal.

A wire with a terminal according to a third embodiment of the present invention is the wire with a terminal according to the second embodiment of the present invention wherein the conductor includes an elemental wire formed of aluminum or an aluminum alloy, and the metal terminal includes copper or an copper alloy.

A wire harness according to a fourth embodiment of the present invention includes the wire with a terminal according to the second embodiment.

The anti-corrosive material according to the present invention includes an ultraviolet curable resin composed of a mixture of a (meth)acrylate monomer having a small number of functional groups and a (meth)acrylate monomer having a large number of functional groups. For this reason, the resulting cured product (sealing member) can have an appropriate crosslinking density to enhance strength, hardness, and surface curability as well as elongation and depth curability.

BRIEF DESCRIPTION OF DRAWINGS

FIG. 2 is a schematic view illustrating the wire with a terminal according to the embodiment connected to a metal terminal;

FIG. 3 is a schematic view illustrating the wire with a terminal according to the embodiment, in which an anti-corrosive material applied onto the joint connecting the metal terminal and the conductor is being cured.

DETAILED DESCRIPTION

Figure 1:
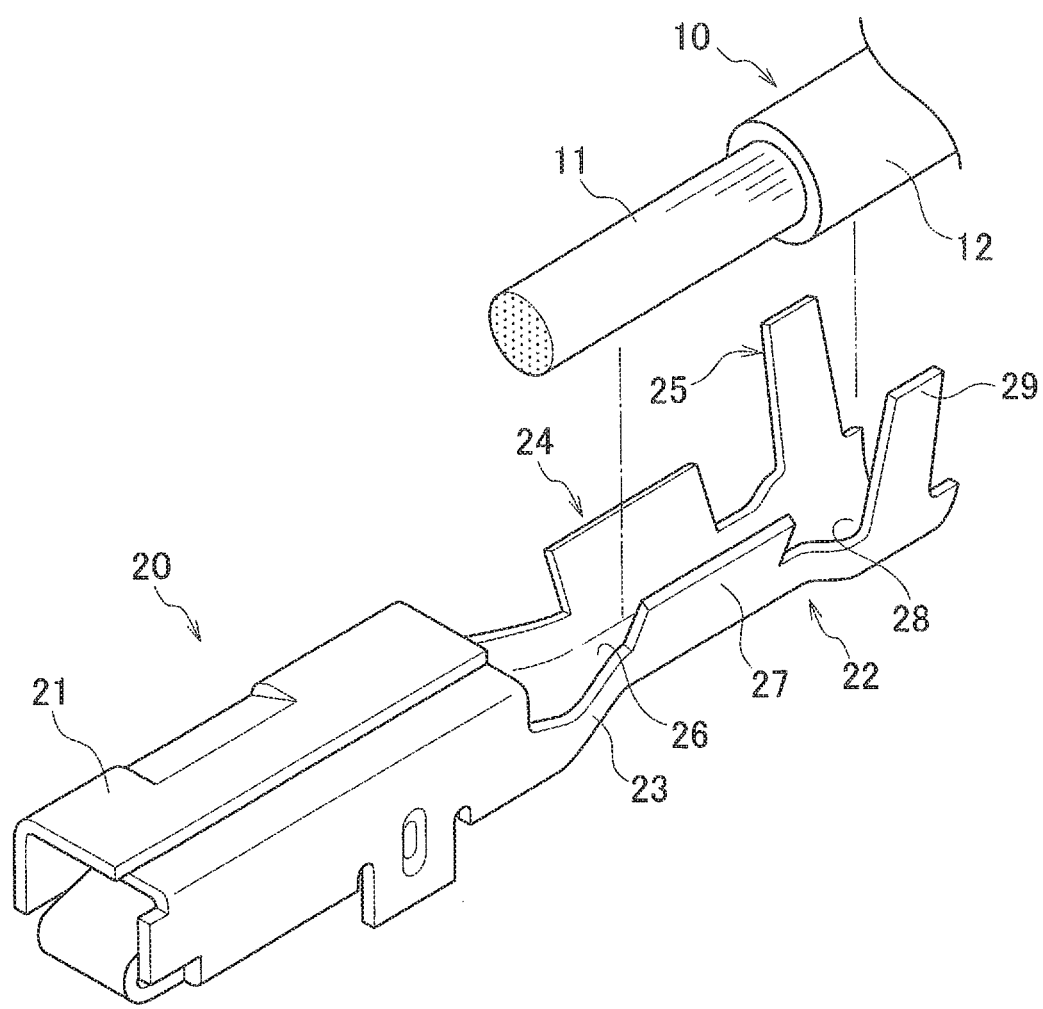
FIG. 1 is a schematic view illustrating a wire with a terminal according to an embodiment before connection of the wire to a metal terminal.

An embodiment according to the present invention will now be described in detail by way of drawings. Dimensional ratios in the drawings are overdrawn for convenience of explanation, and may be different from actual dimensional ratios.

[Anti-Corrosive Material]

The anti-corrosive material according to an exemplary embodiment is applied onto the joint connecting different metal parts to prevent invasion of corroding substances, thereby preventing corrosion of the joint for a long time. The anti-corrosive material according to the present embodiment comprises an ultraviolet curable resin. The ultraviolet curable resin is instantaneously cured through irradiation with ultraviolet light. Furthermore, in use of the ultraviolet curable resin, the subsequent step after the curing step can be immediately performed without a washing step and a drying step; thus, the production process can be shortened.

The ultraviolet curable resin used contains a polymerizable compound, as a main component, composed of at least one of a photopolymerizable (meth)acrylate monomer and a photopolymerizable (meth)acrylate oligomer. An ultraviolet curable resin including the acrylate polymerizable compound can be cured into a sealing member having a high adhesive force to the metal and having high weatherability and impact resistance. Such a sealing member can prevent corrosion of the joint.

The photopolymerizable (meth)acrylate monomer and the photopolymerizable (meth)acrylate oligomer have a functional group having a carbon-carbon unsaturated bond. The (meth)acrylate monomer is classified into a monofunctional (meth)acrylate monomer having one functional group having a carbon-carbon unsaturated bond, a bifunctional (meth)acrylate monomer having two functional groups having a carbon-carbon unsaturated bond, a trifunctional (meth)acrylate monomer having three functional groups having a carbon-carbon unsaturated bond, and a polyfunctional (meth)acrylate monomer having four or more functional groups having a carbon-carbon unsaturated bond. The (meth)acrylate oligomer is classified into a monofunctional (meth)acrylate oligomer having one functional group having a carbon-carbon unsaturated bond, a bifunctional (meth)acrylate oligomer having two functional groups having a carbon-carbon unsaturated bond, a trifunctional (meth)acrylate oligomer having three functional groups having a carbon-carbon unsaturated bond, and a polyfunctional (meth)acrylate oligomer having four or more functional groups having a carbon-carbon unsaturated bond.

If neither monofunctional (meth)acrylate monomer nor bifunctional (meth)acrylate monomer are used as the monomers contained in the ultraviolet curable resin and only at least one of the trifunctional (meth)acrylate monomer and the polyfunctional (meth)acrylate monomer is used, the cured product prepared through curing of such an ultraviolet curable resin tends to have an increased crosslinking density. For this reason, the cured product of the ultraviolet curable resin has enhanced strength and hardness, and also has high surface curability (tackiness). Unfortunately, due to the trade-off, the cured product has reduced elongation and depth curability, and readily peels off. For this reason, such a cured product has difficulties in preventing corrosion of the joints for a long time.

For this reason, the polymerizable compound in the ultraviolet curable resin according to the present embodiment is composed of a combination of the monofunctional (meth)acrylate monomer and the bifunctional (meth)acrylate monomer. Alternatively, the polymerizable compound is composed of a combination of at least one of the monofunctional (meth)acrylate monomer and the bifunctional (meth)acrylate monomer and at least of the trifunctional (meth)acrylate monomer and the polyfunctional (meth)acrylate monomer having four or more functional groups. Use of a mixture of a (meth)acrylate compound having a small number of functional groups and a (meth)acrylate compound having a large number of functional groups, instead of use of only a polyfunctional (meth)acrylate monomer having three or more functional groups, prevents an excessive increase in the crosslinking density of the resulting cured product. For this reason, the cured product can have enhanced strength, hardness, and surface curability as well as enhanced elongation and depth curability. Hence, the cured product can prevent corrosion of the joint for a long time without peeling off from the joint connecting parts composed of different materials. The depth curability represents the index indicating the depth of the cured portion of the resin when irradiated with light from above. A higher depth curability indicates deeper curability of the resin. Throughout the specification, the term "(meth)acrylate" includes acrylate and methacrylate.

Usable monofunctional acrylate monomers are compounds represented by Formula 1. Specific examples thereof include ethoxylated o-phenylphenol acrylate (see Formula (a)), methoxypolyethylene glycol 400 acrylate (see Formula (b), where n=9), methoxypolyethylene glycol 550 acrylate (see Formula (b), where n=13), phenoxypolyethylene glycol acrylate (see Formula (c)), 2-acryloyloxyethyl succinate (see Formula (d)), and isostearyl acrylate (see Formula (e)) made by Shin Nakamura Chemical Co., Ltd. Other examples of the monofunctional acrylate monomer include β-carboxyethyl acrylate, isobornyl acrylate, octyl/decyl acrylate, ethoxylated phenyl acrylate (EO: 2 mol), and ethoxylated phenyl acrylate (EO: 1 mol) made by DAICEL-ALLNEX LTD.

[Formula 1]

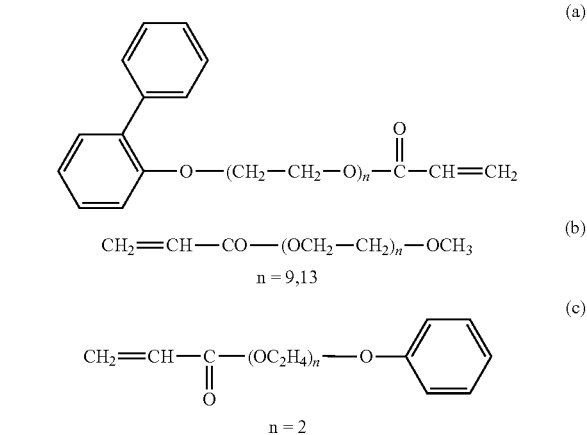

-continued

 (d)

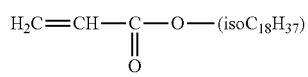 (e)

Usable bifunctional acrylate monomers are compounds represented by Formulae 2-1 to 2-3. Specific examples thereof include 2-hydroxy-3-(acryloyloxy)propyl methacrylate (see Formula (a)), polyethylene glycol 200 diacrylate (see Formula (b), where n=4), polyethylene glycol 400 diacrylate (see Formula (b), where n=9), polyethylene glycol 600 diacrylate (see Formula (b), where n=14), polyethylene glycol 1000 diacrylate (see Formula (b), where n=23), propoxylated ethoxylated bisphenol A diacrylate (see Formula (c)), ethoxylated bisphenol A diacrylate (see Formula (d)), 9,9-bis[4-(2-acryloyloxyethoxy)phenyl]fluorene (see Formula (e)), propoxylated bisphenol A diacrylate (see Formula (f)), tricyclodecane dimethanol diacrylate (see Formula (g)), 1,10-decanediol diacrylate (see Formula (h)), 1,6-hexanediol diacrylate (see Formula (i)), 1,9-nonanediol diacrylate (see Formula (j)), dipropylene glycol diacrylate (see Formula (k)), tripropylene glycol diacrylate (see Formula (l), where m+n=3), polypropylene glycol 400 diacrylate (see Formula (l), where m+n=7), polypropylene glycol 700 diacrylate (see Formula (l), where m+n=12), and polytetramethylene glycol 650 diacrylate (see Formula (m)) made by Shin Nakamura Chemical Co., Ltd. Other examples of the bifunctional acrylate monomer include dipropylene glycol diacrylate, 1,6-hexanediol diacrylate, tripropylene glycol diacrylate, PO-modified neopentyl glycol diacrylate, modified bisphenol A diacrylate, tricyclodecanedimethanol diacrylate, PEG 400 diacrylate, PEG 600 diacrylate, and neopentyl glycol-hydroxypivalic acid ester diacrylate made by DAICEL-ALLNEX

[Formula 2-1]

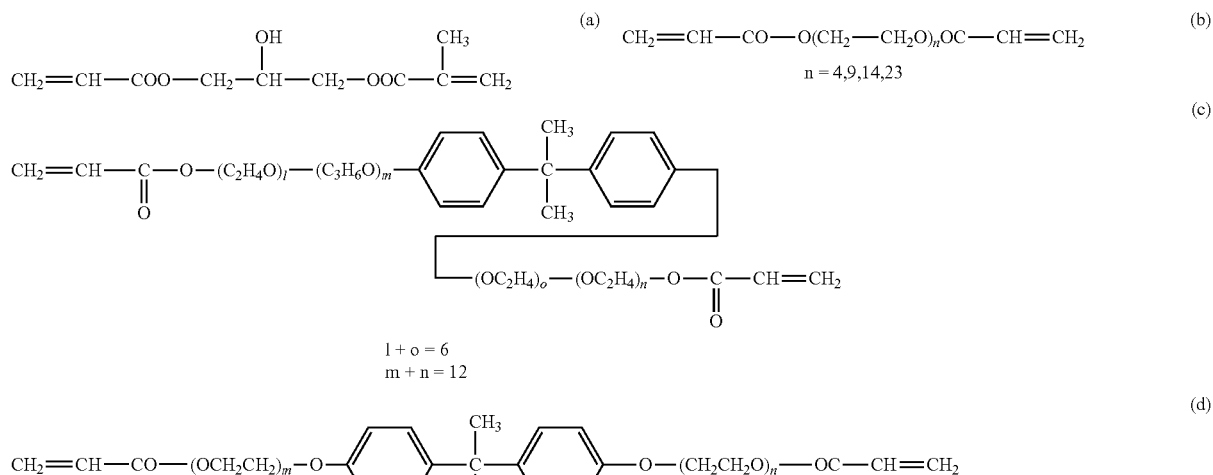

[Formula 2-2]

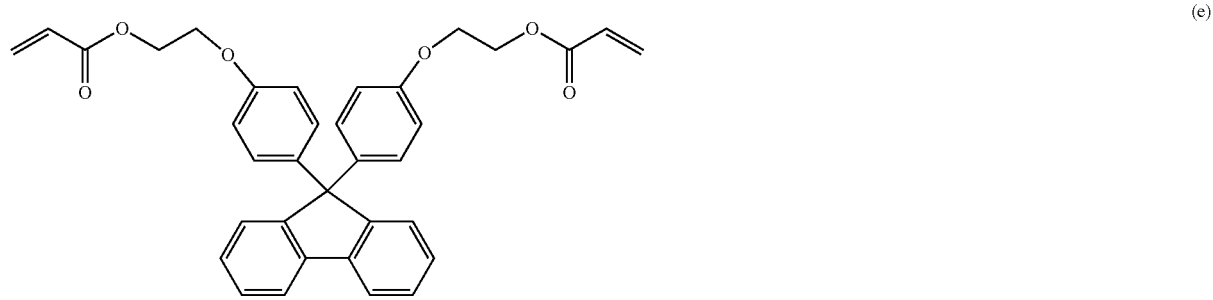

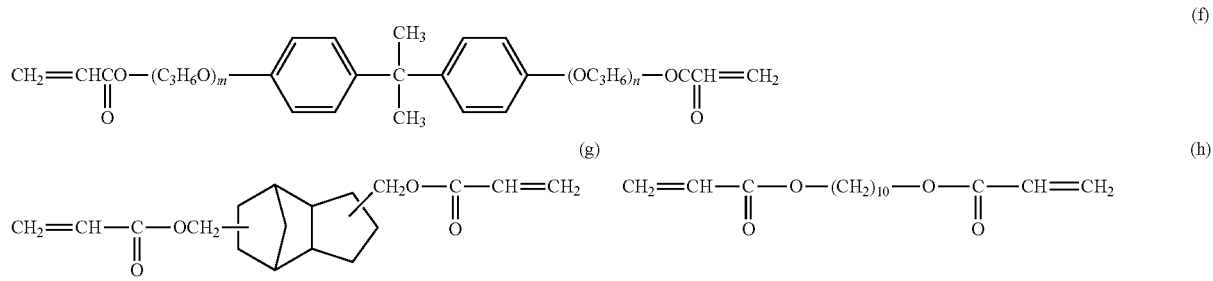

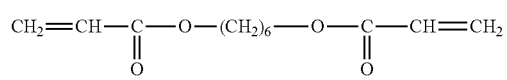

(i)

[Formula 2-3]

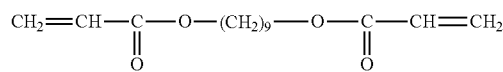

(j)

(k)

$m + n = 2$

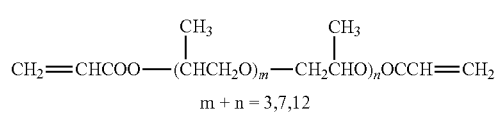

(l)

(m)

$n = 9$ $m + n = 3, 7, 12$

Usable trifunctional acrylate monomers and polyfunctional acrylate monomers are compounds represented by Formulae 3-1 and 3-2. Specific examples thereof include tris(2-acryloxyethyl) isocyanulate (see Formula (a)), ε-caprolactone modified tris(2-acryloxyethyl) isocyanurate (see Formula (b)), ethoxylated glycerine triacrylate (EO: 9 mol) (see Formula (c), where l+m+n=9), ethoxylated glycerine triacrylate (EO: 20 mol) (see Formula (c), where l+m+n=20), pentaerythritol triacrylate (triester: 37%) (see Formula (d)), pentaerythritol triacrylate (triester: 55%) (see Formula (d)), pentaerythritol triacrylate (triester: 57%) (see Formula (d)), trimethylolpropane triacrylate (see Formula (e)), ditrimethylolpropane tetraacrylate (see Formula (f)), ethoxylated pentaerythritol tetraacrylate (see Formula (g)), pentaerythritol tetraacrylate (see Formula (h)), dipentaerythritol polyacrylate (see Formula (i)), and dipentaerythritol hexaacrylate (see Formula (j)) made by Shin Nakamura Chemical Co., Ltd. Other examples of the polyfunctional acrylate monomer include dipentaerythritol pentaacrylate, phthalic acid monohydroxyethylacrylate, and isocyanuric acid ethylene oxide modified-diacrylate.

[Formula 3-1]

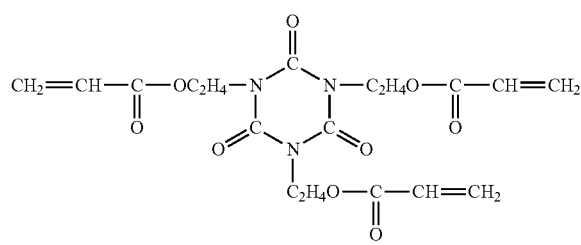

(a)

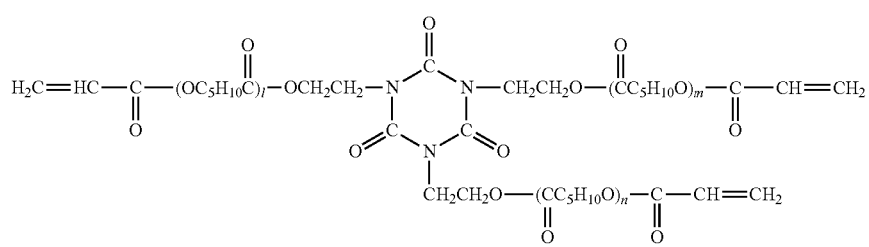

(b)

$l + m + n = 1$

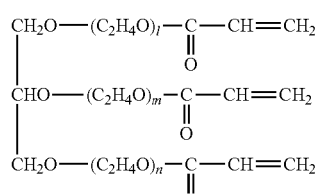

(c)

(d)

$l + m + n = 9.2$

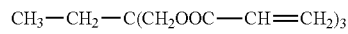  (e)

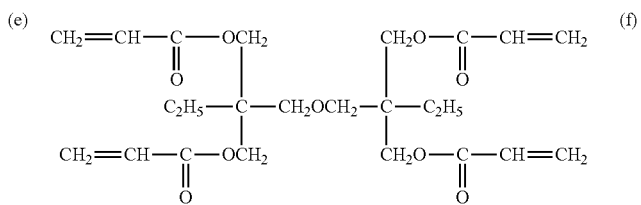  (f)

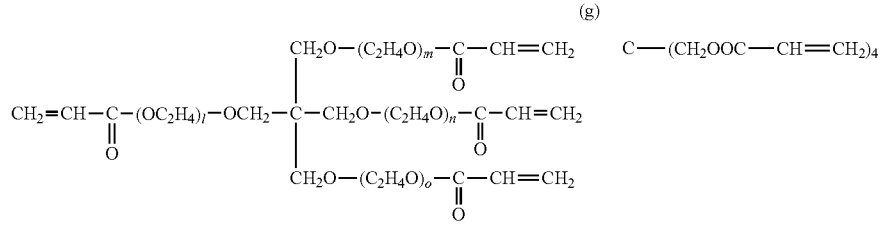  (g)

C—(CH$_2$OOC—CH=CH$_2$)$_4$  (h)

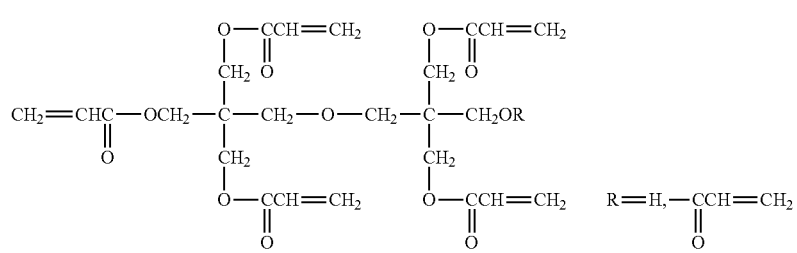  (i)

R=H, —CCH=CH$_2$ / O

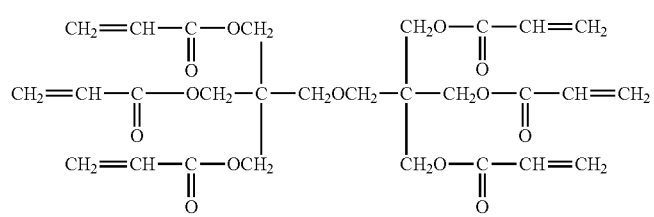  (j)

Examples of the trifunctional acrylate monomer include pentaerythritol (tri/tetra)acrylate, trimethylolpropane triacrylate, trimethylolpropane ethoxytriacrylate, trimethylolpropane propoxytriacrylate, and glycerin propoxytriacrylate made by DAICEL-ALLNEX LTD. Examples of the polyfunctional acrylate monomers having four or more functional groups include pentaerythritol ethoxytetraacrylate, ditrimethylolpropane tetraacrylate, ditrimethylolpropane tetraacrylate, pentaerythritol (tri/tetra)acrylate, and dipentaerythritol hexaacrylate made by DAICEL-ALLNEX LTD.

Usable monofunctional methacrylate monomers are compounds represented by Formula 4. Specific examples thereof include β-methacryloyloxyethyl hydrogen phthalate (see Formula (a)), methoxy polyethylene glycol 400 methacrylate (see Formula (b), where n=9), methoxy polyethylene glycol 1000 methacrylate (see Formula (b), where n=23), phenoxy ethylene glycol methacrylate (see Formula (c)), stearyl methacrylate (see Formula (d)), and 2-methacryloyloxyethyl succinate (see Formula (e)) made by Shin Nakamura Chemical Co., Ltd.

[Formula 4]

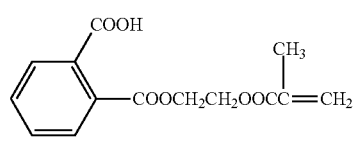  (a)

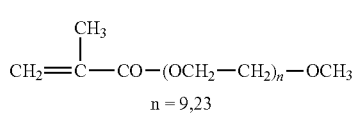  (b)

n = 9, 23

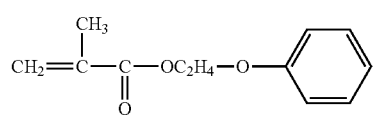  (c)

CH$_2$=C(CH$_3$)COO—CH$_2$(CH$_2$)$_{16}$CH$_3$  (d)

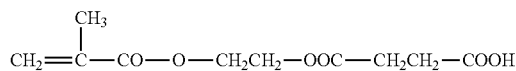

Usable bifunctional methacrylate monomers are compounds represented by Formulae 5-1 and 5-2. Specific examples thereof include ethylene glycol dimethacrylate (see Formula (a)), diethylene glycol dimethacrylate (see Formula (b), where n=2), triethylene glycol dimethacrylate (see Formula (b), where n=3), polyethylene glycol 200 dimethacrylate (see Formula (b), where n=4), polyethylene glycol 400 dimethacrylate (see Formula (b), where n=9), polyethylene glycol 600 dimethacrylate (see Formula (b), where n=14), polyethylene glycol 1000 dimethacrylate (see Formula (b), where n=23), ethoxylated bisphenol A dimethacrylate (see Formula (c)), tricyclodecane dimethanol dimethacrylate (see Formula (d)), 1,10-decanediol dimethacrylate (see Formula (e)), 1,6-hexanediol dimethacrylate (see Formula (f)), 1,9-nonanediol dimethacrylate (see Formula (g)), neopentyl glycol dimethacrylate (see Formula (h)), ethoxylated polypropylene glycol 700 dimethacrylate (see Formula (i)), glycerin dimethacrylate ((j)), and polypropylene glycol 400 dimethacrylate (see Formula (k)) made by Shin Nakamura Chemical Co., Ltd.

Usable trifunctional methacrylate monomers are compounds represented by Formula 6. Specific examples thereof include trimethylolpropane trimethacrylate made by Shin Nakamura Chemical Co., Ltd.

[Formula 6]

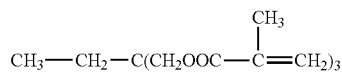

Other usable photopolymerizable (meth)acrylate oligomers are aromatic urethane acrylate, aliphatic urethane acrylate, polyester acrylate, and epoxy acrylate made by DAICEL-ALLNEX LTD. Examples of the epoxy acrylate include bisphenol A epoxy acrylate, epoxy acrylate, epoxyfied soybean oil acrylate, modified epoxy acrylate, fatty acid-modified epoxy acrylate, and amine-modified bisphenol A epoxy acrylate.

Examples of the photopolymerizable (meth)acrylate oligomer also include acrylic acrylates, such as polybasic acid-modified acrylic oligomer, and silicone acrylate.

Preferred monofunctional (meth)acrylate monomers are isobornyl acrylate and ethoxylated phenyl acrylate. Preferred bifunctional (meth)acrylate monomers are 2-hydroxy-

[Formula 5-1]

(a)

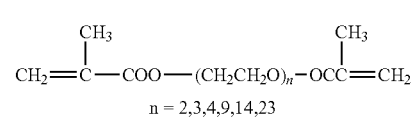

(b)

$n = 2,3,4,9,14,23$

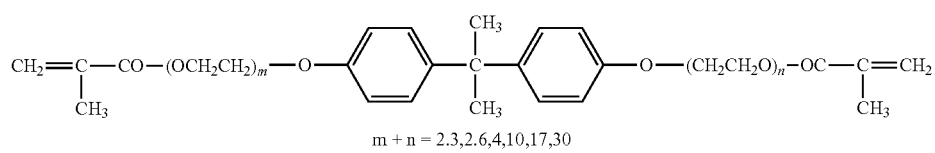

(c)

$m + n = 2.3, 2.6, 4, 10, 17, 30$

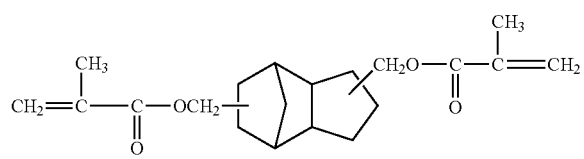

(d)

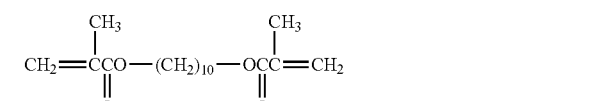

(e)

[Formula 5-2]

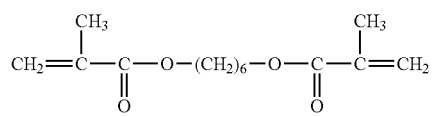

(f)

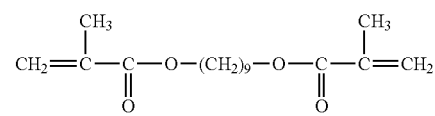

(g)

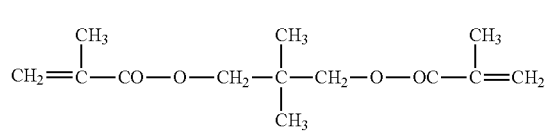

(h)

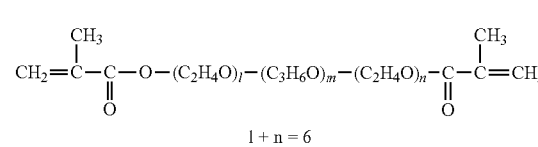

(i)

$l + n = 6$
$m = 12$

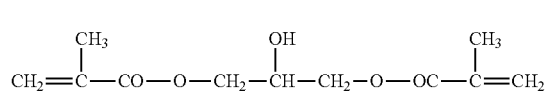

(j)

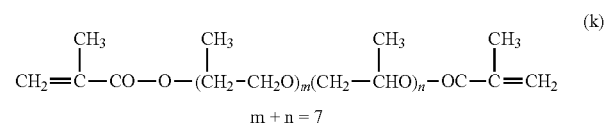

(k)

$m + n = 7$ 3-(acryloyloxy)propyl methacrylate and dipropylene glycol diacrylate. Preferred trifunctional (meth)acrylate monomers are glycerin propoxytriacrylate and trimethylolpropane propoxytriacrylate. Preferred polyfunctional (meth)acrylate monomers having four or more functional groups are pentaerythritol ethoxy tetraacrylate and ditrimethylolpropane tetraacrylate.

In the polymerizable compound according to the present embodiment, the mixing proportion of the monofunctional (meth)acrylate monomer, the bifunctional (meth)acrylate monomer, the trifunctional (meth)acrylate monomer, and the polyfunctional (meth)acrylate monomer having four or more functional groups is not limited to the proportions used in Examples described later; these monomers can be mixed in any proportion so as to attain the advantageous effects of the present invention.

The ultraviolet curable resin according to the present embodiment preferably includes the polymerizable compound and a photopolymerization initiator for accelerating curing of the resin with ultraviolet light. The photopolymerization initiator is a compound which initiates the polymerization reaction of the photopolymerizable monomer or the photopolymerizable oligomer. The photopolymerization initiator absorbs a light component having a specific wavelength from ultraviolet light to be excited, generating radicals.

A photopolymerization initiator to be used in the present embodiment is at least one photopolymerization initiator selected from the group consisting of benzoin ether photopolymerization initiators, ketal photopolymerization initiators, acetophenone photopolymerization initiators, benzophenone photopolymerization initiators, and thioxanthone photopolymerization initiators, for example. These photopolymerization initiators are only examples, and the present embodiment will not be limited to these examples. In other words, a variety of compounds can be used as the photopolymerization initiator according to the purpose.

The ultraviolet curable resin according to the present embodiment contains the polymerizable compound as the main component. The ultraviolet curable resin according to the present embodiment can contain other monomers and oligomers in addition to the polymerizable compound. Furthermore, the ultraviolet curable resin can contain at least one of the following additives. Examples of such usable additives include photopolymerization initiating assistant agents, anti-adhesive agents, fillers, plasticizers, non-reactive polymers, coloring agents, flame retardants, flame retardant assistant agents, anti-softening agents, mold release agents, desiccants, dispersants, wetting agents, anti-settling agents, thickeners, antistatic agents, matting agents, anti-blocking agents, anti-skinning agents, and surfactants.

As described above, the anti-corrosive material according to the present embodiment is composed of the ultraviolet curable resin. For this reason, the anti-corrosive material is instantaneously cured through irradiation with ultraviolet light. Furthermore, in use of such an anti-corrosive material, the step subsequent to the curing step can be performed without a washing step and a drying step; thus, the production process can be shortened. An ultraviolet curable resin having a significantly high viscosity is unintentionally applied onto the joint in an excess applied thickness. This increases the thickness of the coating (sealing member) formed through curing of the anti-corrosive material. The coating of the sealing member having such an excessively large thickness cannot be inserted into the cavity of the connector housing during accommodation of the metal terminal in an existing connector housing as described later, so that the existing connector housing may not be used.

In contrast, the anti-corrosive material according to the present embodiment has a viscosity at 25° C. of 18900 mPa·s or less measured according to JIS Z8803 (methods for viscosity measurement of liquid). The viscosity within this range prevents a significantly increase in the applied thickness of the anti-corrosive material and thus the thickness of the coating (sealing member) formed through curing of the anti-corrosive material, therefore enabling use of existing connector housings. The lower limit value of the viscosity of the ultraviolet curable resin can be any value. The lower limit value can be 300 mPa·s or more, for example. A viscosity of the ultraviolet curable resin of 300 mPa·s or more prevents dripping of the coating solution applied onto the joint, resulting in an approximately uniform thickness of the cured coating formed through curing of the anti-corrosive material and enhanced anti-corrosiveness of the joint.

The anti-corrosive material according to the present embodiment includes an ultraviolet curable resin including, as a main component, a polymerizable compound being composed of at least one of a photopolymerizable (meth)acrylate monomer and a photopolymerizable (meth)acrylate oligomer. The polymerizable compound is composed of a combination of a monofunctional (meth)acrylate monomer and a bifunctional (meth)acrylate monomer, or a combination of at least one of a monofunctional (meth)acrylate monomer and a bifunctional (meth)acrylate monomer and at least one of a trifunctional (meth)acrylate monomer and a polyfunctional (meth)acrylate monomer having four or more functional groups. The anti-corrosive material has a viscosity at 25° C. of 18900 mPa·s or less measured according to JIS Z8803.

In the present embodiment, a mixture of a (meth)acrylate monomer having a small number of functional groups and a (meth)acrylate monomer having a large number of functional groups is used as the anti-corrosive material. For this reason, the resulting cured product has an appropriate crosslinking density, and can have enhanced strength, hardness, and surface curability as well as enhanced elongation. If a monomer contained in the ultraviolet curable resin is only a polyfunctional (meth)acrylate monomer having three or more functional groups, depth curability can be reduced, so that the resin is not sufficiently cured in the inside of the applied anti-corrosive material. As a result, the resin could peel off from the joint, reducing the anti-corrosiveness. In the present embodiment, however, the ultraviolet curable resin contains a (meth)acrylate compound having a small number of functional groups. Such an ultraviolet curable resin can prevent a reduction in depth curability, thus preventing peel off of the anti-corrosive material, and enhancing the anti-corrosiveness.

Moreover, the anti-corrosive material has a viscosity of the predetermined value or less, and can prevent a significant increase in the applied thickness of the anti-corrosive material and thus the thickness of the coating formed through curing of the anti-corrosive material. Furthermore, the anti-corrosive material is instantaneously cured through irradiation with ultraviolet light. In use of such an anti-corrosive material, the step subsequent to the curing step can be performed without a washing step and a drying step; thus, the production process can be shortened. In the present embodiment, a liquid of the anti-corrosive material is applied onto the joint, and is cured through irradiation with ultraviolet light. Accordingly, a highly anti-corrosive sealing member can be formed on wires and joints having any shape.

[Wire with Terminal]

The wire with a terminal according to an embodiment will now be described. As illustrated in FIGS. 1 to 3, a wire 1 with a terminal according to the present embodiment includes: a wire 10 including a conductive conductor 11 and a wire covering member 12 disposed over the conductor 11; and a metal terminal 20 connected to the conductor 11 of the wire 10. The wire 1 with a terminal includes a sealing member 30 formed by curing the anti-corrosive material and covering the joint connecting the conductor 11 and the metal terminal 20.

The metal terminal 20 of the wire 1 with a terminal is of a female type, which includes an electrical connection 21 in the anterior portion thereof to be connected to its mating terminal not illustrated. The electrical connection 21 has a built-in spring to be engaged with the mating terminal, and has a box shape. The metal terminal 20 includes a wire connection 22 in the posterior portion thereof with a connection portion 23 in between. The wire connection 22 is connected to the leading end of the wire 10 by being crimped to the metal terminal 20.

The wire connection 22 includes a conductor crimp portion 24 in the anterior portion thereof and a covering member crimping portion 25 in the posterior portion thereof.

The conductor crimp portion 24 in the anterior portion is brought into contact with the conductor 11 exposed through removal of the wire covering member 12 at the leading end of the wire 10. The conductor crimp portion 24 includes a bottom plate 26 and a pair of conductor crimping pieces 27. The conductor crimping pieces 27 extend upright from both lateral sides of the bottom plate 26. The conductor crimping pieces 27 are bent inwardly so as to wrap the conductor 11 of the wire 10, thereby crimping the conductor 11 such that the conductor 11 is firmly pressed against the top surface of the bottom plate 26. The cross section of the conductor crimp portion 24 has an approximately U-shape formed by the bottom plate 26 and the pair of conductor crimping pieces 27.

The covering member crimping portion 25 in the posterior portion directly contacts the wire covering member 12 at the leading end of the wire 10. The covering member crimping portion 25 includes a bottom plate 28 and a pair of covering member crimping pieces 29. The covering member crimping pieces 29 extend upright from both lateral sides of the bottom plate 28. The covering member crimping pieces 29 are bent inwardly so as to wrap the wire covered with the wire covering member 12, thereby crimping the wire covering member 12 such that the wire covering member 12 is firmly pressed against the top surface of the bottom plate 28. The cross section of the covering member crimping portion 25 has an approximately U-shape formed by the bottom plate 28 and the pair of covering member crimping pieces 29. The bottom plate 26 of the conductor crimp portion 24 and the bottom plate 28 of the covering member crimping portion 25 are continuously formed as a single bottom plate.

In the present embodiment, as illustrated in FIGS. 1 and 2, the leading end of the wire 10 is inserted in the wire connection 22 of the metal terminal 20 having the above configuration. Through this operation, the conductor 11 of the wire 10 is disposed on the top surface of the bottom plate 26 of the conductor crimp portion 24, and the wire 10 covered with the wire covering member 12 is disposed on the top surface of the bottom plate 28 of the covering member crimping portion 25. Then, the wire connection 22 is pressed against the leading end of the wire 10 to deform the conductor crimp portion 24 and the covering member crimping portion 25. In other words, the conductor crimping pieces 27 of the conductor crimp portion 24 are bent inwardly so as to wrap the conductor 11, thereby crimping the conductor 11 such that the conductor 11 closely contacts the top surface of the bottom plate 26. Furthermore, the covering member crimping pieces 29 of the covering member crimping portion 25 are bent inwardly so as to wrap the wire covered with the wire covering member 12, thereby crimping the wire covering member 12 such that the wire covering member 12 closely contacts the top surface of the bottom plate 28. As a result, the metal terminal 20 can be connected to the wire 10 through press fitting.

In the present embodiment, as illustrated in FIG. 3, the upper portions of the connection portion 23, the wire connection 22, and the conductor 11 and the wire covering member 12 covered with the wire connection 22 are covered with the sealing member 30 through coating. In other words, the sealing member 30 covers a part of the connection portion 23 across the boundary of the conductor crimp portion 24 and the leading end of the conductor 11 of the wire 10, and covers a part of the wire covering member 12 across the boundary of the covering member crimping portion 25 and the wire covering member 12. Thus, corrosion of the joint connecting the conductor 11 and the wire connection 22 can be prevented through disposition of the conductor 11 and the wire covering member 12 in the wire connection 22 and covering of the upper portions thereof with the sealing member 30.

The sealing member 30 is a cured product formed by curing the anti-corrosive material containing the ultraviolet curable resin with ultraviolet light.

The conductor 11 of the wire 10 can be formed with a metal material having high conductivity, such as copper, a copper alloy, aluminum, or an aluminum alloy. The conductor 11 having a tin-plated surface can also be used as the material for the conductor 11. Use of aluminum or an aluminum alloy having a light weight as the conductor 11 is preferred because a reduction in weight of the wire harness has been required. For this reason, the conductor 11 is preferably includes an elemental wire formed of aluminum or an aluminum alloy.

The wire covering member 12 for covering the conductor 11 can be formed with a resin material which can ensure electric insulation, such as resins containing polyvinyl chloride (PVC) as a main component and olefin resins. Specific examples of the olefin resin include polyethylene (PE), polypropylene (PP), ethylene copolymers, and propylene copolymers.

The metal terminal 20 can be formed with a metal material (material for a terminal) having high conductivity; for example, at least one of copper, a copper alloy, stainless steel, tin-plated copper, a tin-plated copper alloy, and tin-plated stainless steel can be used. Alternatively, at least one of gold-plated copper, copper alloy, and stainless steel may be used, or at least one of silver-plated copper, copper alloy, and stainless steel may be used. A preferred metal terminal contains copper or a copper alloy.

The process of producing the wire with a terminal according to the present embodiment will now be described. In production of the wire 1 with a terminal, the leading end of the wire 10 is first inserted in the wire connection 22 of the metal terminal 20 as illustrated in FIGS. 1 and 2. As a result, the conductor 11 of the wire 10 is disposed on the top surface of the bottom plate 26 of the conductor crimp portion 24, and the wire 10 covered with the wire covering member 12 is disposed on the top surface of the bottom plate 28 of the covering member crimping portion 25. Then, the conductor crimping pieces 27 of the conductor crimp portion 24 are bent inwardly to crimp the conductor 11 such that the conductor 11 closely contacts the top surface of the bottom plate 26. The covering member crimping pieces 29 of the covering member crimping portion 25 are bent inwardly to crimp the wire covering member 12 such that the wire covering member 12 closely contacts the top surface of the bottom plate 28. As a result, the metal terminal 20 can be connected to the wire 10.

Next, the anti-corrosive material is applied onto the joint connecting the metal terminal 20 and the wire 10. In this operation, the anti-corrosive material can be applied by any method, such as a dispenser applicator. The anti-corrosive material is applied so as to cover the joint as illustrated in FIG. 3. To ensure high anti-corrosive performance, it is preferred that the anti-corrosive material covers a part of the connection portion 23 across the boundary of the conductor crimp portion 24 and the leading end of the conductor 11 of the wire 10, and covers a part of the wire covering member 12 across the boundary of the covering member crimping portion 25 and the wire covering member 12.

Next, the ultraviolet curable resin applied onto the metal terminal 20 and the wire 10 is irradiated with ultraviolet light from an ultraviolet light irradiation apparatus 40. The intensity of the ultraviolet light to be irradiated and the irradiation time can be appropriately set according to the ultraviolet curable resin to be used and the amount thereof to be applied. The ultraviolet curable resin is instantaneously cured through irradiation with ultraviolet light before the ultraviolet curable resin is lopsided. As a result, the sealing member 30 is formed on the surfaces of the metal terminal 20 and the wire 10.

It is known that the ultraviolet curable resin causes reaction inhibition if contacting oxygen during curing. One of the causes of this reaction inhibition is that oxygen in the air reacts with radicals generated by the photopolymerization initiator to consume radicals; as a result, the polymerization reaction of the ultraviolet curable resin is reduced, and curing of the resin is not sufficiently promoted. For this reason, use of an ultraviolet curable resin barely affected by curing inhibition by oxygen is preferred.

A step of cooling the sealing member 30 may be optionally performed after curing of the ultraviolet curable resin through irradiation with ultraviolet light. Examples of the method of cooling the sealing member 30 include a method of blowing air onto the sealing member 30 to cool the sealing member 30.

Thus, the wire with a terminal according to the present embodiment includes the sealing member 30 formed by curing the anti-corrosive material with ultraviolet light. Moreover, the anti-corrosive material has a viscosity of the predetermined value or less, and can prevent a significant increase in the applied thickness of the anti-corrosive material and thus the thickness of the coating formed through curing of the anti-corrosive material. Accordingly, the wire with a terminal according to the present embodiment can be inserted into existing connector housings having the conventional sizes without changing the dimensions of the pitches thereof as described later. For this reason, there is no need to change design of the connector housings for the wire with a terminal according to the present embodiment.

[Wire Harness]

Figure 4:
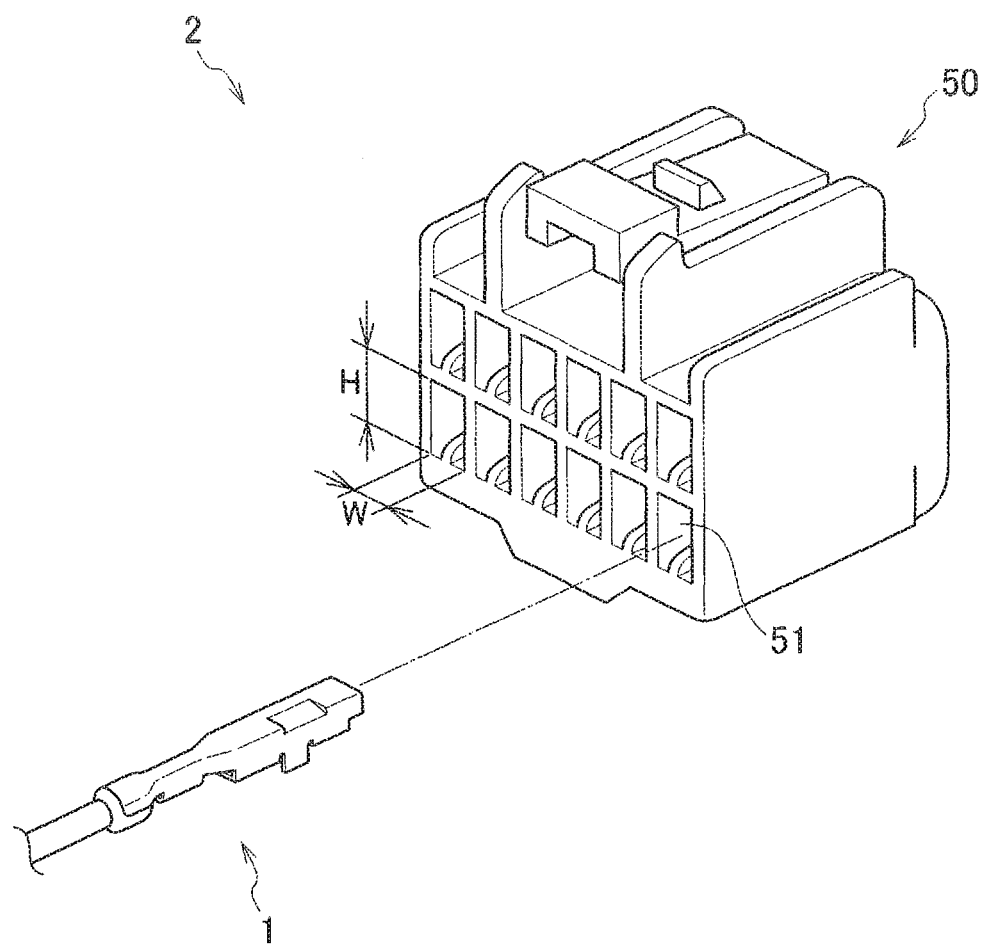
FIG. 4 is a perspective view illustrating a wire harness according to an embodiment of the present invention.

The wire harness according to the present embodiment will now be described. The wire harness according to the present embodiment includes the wire with a terminal. Specifically, as illustrated in FIG. 4, a wire harness 2 includes a connector housing 50 and the wire 1 with a terminal described above.

The front surface of the connector housing 50 includes a plurality of terminal connectors (not illustrated) to which the mating terminals are attached. The rear surface of the connector housing 50 includes a plurality of cavities 51. Each cavity 51 has an approximately rectangular opening to receive the metal terminal 20 and the sealing member 30 of the wire 1 with a terminal. The opening of the cavity 51 is formed slightly larger than the cross sections of the metal terminal 20 and the sealing member 30. The metal terminal 20 is attached to the connector housing 50. The wire 10 is extended from the rear surface of the connector housing 50.

As described above, the anti-corrosive material has a viscosity of the predetermined value or less, and prevents a significant increase in the applied thickness of the anti-corrosive material and thus the thickness of the coating formed through curing of the anti-corrosive material. For this reason, the sealing member of the wire 1 with a terminal can be formed to have a width smaller than the width W of the opening of the cavity 51 in the connector housing 50, the metal terminal 20 and the sealing member 30 being inserted into the opening. The anti-corrosive material of the wire 1 with a terminal can be formed to have a maximum height smaller than the height H of the opening of the cavity 51 in the connector housing 50, the metal terminal 20 and the sealing member 30 being inserted into the opening.

Thus, the sealing member 30 according to the present embodiment can be formed to have a smaller thickness. There is no special need to change the dimension of the pitch of the connector housing 50. For this reason, the wire with a terminal according to the present embodiment can be inserted into the connector housing having a conventional dimension. As a result, the conventional connector housing can be used without changing design of the connector housing specially for the wire with a terminal.

EXAMPLES

The present invention will now be described in more detail by way of Examples and Comparative Examples, but the present invention will not be limited to these Examples.

The following compounds were used as oligomers, monomers, and photopolymerization initiators in production of wires with terminals in Examples and Comparative Examples:

Oligomer 1: EBECRYL (registered trademark) 8402 (aliphatic urethane acrylate) made by DAICEL-ALLNEX LTD., average molecular weight Mw: 1000

Oligomer 2: EBECRYL 4858 (aliphatic urethane acrylate) made by DAICEL-ALLNEX LTD., average molecular weight Mw: 450

Monofunctional monomer: IBOA (isobornyl acrylate) made by DAICEL-ALLNEX LTD.

Bifunctional monomer: TPGDA (tripropylene glycol diacrylate) made by DAICEL-ALLNEX LTD.

Trifunctional monomer 1: PETRA (pentaerythritol triacrylate) made by DAICEL-ALLNEX LTD.

Trifunctional monomer 2: TMPTA (trimethylolpropane triacrylate) made by DAICEL-ALLNEX LTD.

Polyfunctional monomer: EBECRYL 140 (ditrimethylolpropane tetraacrylate) made by DAICEL-ALLNEX LTD.

Photopolymerization initiator: IRGACURE (registered trademark) 369 made by BASF SE Example 1

First, the monofunctional monomer, the bifunctional monomer, and the photopolymerization initiator were mixed in mass proportions of 90, 10, and 2, respectively, with 100 parts by mass of the oligomer 1 to prepare an anti-corrosive material.

Next, aluminum was used as a conductor, and polyvinyl chloride (PVC) was used as a wire covering member to prepare a wire. Tin-plated copper was prepared as a metal terminal.

The wire was connected to the metal terminal, and the anti-corrosive material was applied onto the joint connecting the metal terminal and the wire. The anti-corrosive material was cured with a UV lamp to prepare a wire with a terminal in the present example.

Example 2

The monofunctional monomer, the bifunctional monomer, the trifunctional monomer 1, the polyfunctional monomer, and the photopolymerization initiator were mixed in mass proportions of 20, 5, 5, 5, and 2, respectively, with 100 parts by mass of the oligomer 1 to prepare an anti-corrosive material. Except for this, a wire with a terminal in the present example was prepared in the same manner as in Example 1.

Example 3

The monofunctional monomer, the bifunctional monomer, the trifunctional monomer 1, and the photopolymerization initiator were mixed in mass proportions of 3, 3, 3, and 2, respectively, with 100 parts by mass of the oligomer 1 to prepare an anti-corrosive material. Except for this, a wire with a terminal in the present example was prepared in the same manner as in Example 1.

Example 4

The monofunctional monomer, the bifunctional monomer, the polyfunctional monomer, and the photopolymerization initiator were mixed in mass proportions of 30, 5, 5, and 2, respectively, with 100 parts by mass of the oligomer 1 to prepare an anti-corrosive material. Except for this, a wire with a terminal in the present example was prepared in the same manner as in Example 1.

Example 5

The monofunctional monomer, the trifunctional monomer 1, and the photopolymerization initiator were mixed in mass proportions of 20, 5, and 2, respectively, with 100 parts by mass of the oligomer 1 to prepare an anti-corrosive material. Except for this, a wire with a terminal in the present example was prepared in the same manner as in Example 1.

Example 6

The bifunctional monomer, the polyfunctional monomer, and the photopolymerization initiator were mixed in mass proportions of 5, 5, and 2, respectively with 100 parts by mass of the oligomer 1 to prepare an anti-corrosive material. Except for this, a wire with a terminal in the present example was prepared in the same manner as in Example 1.

Comparative Example 1

The monofunctional monomer and the photopolymerization initiator were mixed in mass proportions of 100 and 2, respectively, with 100 parts by mass of the oligomer 1 to prepare an anti-corrosive material. Except for this, a wire with a terminal in the present example was prepared in the same manner as in Example 1.

Comparative Example 2

The bifunctional monomer and the photopolymerization initiator were mixed in mass proportions of 65 and 2, respectively, with 100 parts by mass of the oligomer 1 to prepare an anti-corrosive material. Except for this, a wire with a terminal in the present example was prepared in the same manner as in Example 1.

Comparative Example 3

The trifunctional monomer 2 and the photopolymerization initiator were mixed in mass proportions of 45 and 2, respectively, with 100 parts by mass of the oligomer 1 to prepare an anti-corrosive material. Except for this, a wire with a terminal in the present example was prepared in the same manner as in Example 1.

Comparative Example 4

The polyfunctional monomer and the photopolymerization initiator were mixed in mass proportions of 5 and 2, respectively, with 100 parts by mass of the oligomer 2 to prepare an anti-corrosive material. Except for this, a wire with a terminal in the present example was prepared in the same manner as in Example 1.

Comparative Example 5

The trifunctional monomer 2, the polyfunctional monomer, and the photopolymerization initiator were mixed in mass proportions of 5, 5, and 2, respectively, with 100 parts by mass of the oligomer 1 to prepare an anti-corrosive material. Except for this, a wire with a terminal in the present example was prepared in the same manner as in Example 1.

[Viscosity]

The viscosities at 25° C. of the anti-corrosive materials used in Examples and Comparative Examples were measured according to JIS Z8803. The viscosities were measured by B type rotational viscometer (TV-10H) at 50 rpm.

[Evaluation of Anti-Corrosiveness]

The anti-corrosive performance of the wires with terminals prepared in Examples and Comparative Examples was evaluated based on the measurement method specified in Japanese Industrial Standards JIS C60068-2-11 (Basic Environmental Testing Procedures Part 2: Tests-Test Ka: Salt mist). Namely, the joints connecting the conductors and the metal terminals of the wires with terminals were subjected to a salt mist test. More specifically, the test was performed at a temperature of 35±2° C., at relative humidity (RH) of 85% or more, a concentration of salt water of 5±1%, and the test period of 4 days. Subsequently, the joints in Examples and Comparative Examples were visually observed to determine whether corrosion (rust) was generated in the joints or not. The joints were ranked as "X" if no corrosion was found, and was ranked as "Y" if corrosion was found.

[Evaluation of Insertion into Connector Housing]

The wires with terminals in Examples and Comparative Examples were each inserted into a connector housing. It was visually determined whether the sealing member contacted the peripheral wall of the cavity during insertion of the wire into the connector housing. The sealing members were ranked as "X" if not contacting the peripheral wall of the cavity, and was ranked as "Y" if contacting the peripheral wall of the cavity. A wire ALVSS 2 sq was used, and a connector housing 2.3II was used in this evaluation.

The oligomers, the monomers, and the photopolymerization initiators used in Examples and Comparative Examples, and the results of evaluation of the viscosity of the anti-corrosive material, anti-corrosive and evaluation of insertion into the connector housing are shown in Tables 1 and 2.

Examples 2 to 6 using a combination of at least one of the monofunctional (meth)acrylate monomer and the bifunctional (meth)acrylate monomer and at least one of the trifunctional (meth)acrylate monomer and the polyfunctional (meth)acrylate monomer also had good results in evaluation of anti-corrosiveness and evaluation of insertion into the connector housing.

In contrast, anti-corrosiveness was insufficient in Comparative Examples 1 to 4 each using the monofunctional

TABLE 1

| | | Product name | Example 1 | Example 2 | Example 3 | Example 4 | Example 5 | Example 6 |
|---|---|---|---|---|---|---|---|---|
| Composition | Oligomer 1 (Parts by mass) | EBECRYL 8402 | 100 | 100 | 100 | 100 | 100 | 100 |
| | Oligomer 2 (Parts by mass) | EBECRYL 4858 | — | — | — | — | — | — |
| | Monofunctional monomer (Parts by mass) | IBOA | 90 | 20 | 3 | 30 | 20 | — |
| | Bifunctional monomer (Parts by mass) | TPGDA | 10 | 5 | 3 | 5 | — | 5 |
| | Trifunctional monomer 1 (Parts by mass) | PETRA | — | 5 | 3 | — | 5 | — |
| | Trifunctional monomer 2 (Parts by mass) | TMPTA | — | — | — | — | — | — |
| | Polyfunctional monomer (Parts by mass) | EBECRYL 140 | — | 5 | — | 5 | — | 5 |
| | Photopolymerization initiator (Parts by mass) | IRGACURE 369 | 2 | 2 | 2 | 2 | 2 | 2 |
| Evaluation | Viscosity (mPa · s) | | 300 | 2800 | 9600 | 2200 | 4300 | 18900 |
| | Insertion into connector | | X | X | X | X | X | X |
| | Anti-corrosiveness | | X | X | X | X | X | X |

TABLE 2

| | | Product name | Comparative Example 1 | Comparative Example 2 | Comparative Example 3 | Comparative Example 4 | Comparative Example 5 |
|---|---|---|---|---|---|---|---|
| Composition | Oligomer 1 (Parts by mass) | EBECRYL 8402 | 100 | 100 | 100 | — | 100 |
| | Oligomer 2 (Parts by mass) | EBECRYL 4858 | — | — | — | 100 | — |
| | Monofunctional monomer (Parts by mass) | IBOA | 100 | — | — | — | — |
| | Bifunctional monomer (Parts by mass) | TPGDA | — | 65 | — | — | — |
| | Trifunctional monomer 1 (Parts by mass) | PETRA | — | — | — | — | — |
| | Trifunctional monomer 2 (Parts by mass) | TMPTA | — | — | 45 | — | 5 |
| | Polyfunctional monomer (Parts by mass) | EBECRYL 140 | — | — | — | 5 | 5 |
| | Photopolymerization initiator (Parts by mass) | IRGACURE 369 | 2 | 2 | 2 | 2 | 2 |
| Evaluation | Viscosity (mPa · s) | | 300 | 1000 | 5000 | 7000 | 20000 |
| | Insertion into connector | | X | X | X | X | Y |
| | Anti-corrosiveness | | Y | Y | Y | Y | Y |

Table 1 evidently shows that Example 1 using a combination of the monofunctional (meth)acrylate monomer and bifunctional (meth)acrylate monomer had good results in evaluation of anti-corrosiveness and evaluation of insertion into the connector housing. Table 1 also shows that (meth)acrylate monomer, the bifunctional (meth)acrylate monomer, the trifunctional (meth)acrylate monomer, or the polyfunctional (meth)acrylate monomer alone. In Comparative Example 5 using a combination of the trifunctional (meth)acrylate monomer and the polyfunctional (meth)acrylate monomer, anti-corrosiveness was insufficient because the inside of the coating of the anti-corrosive material was not sufficiently cured, and the coating peeled off. The anti-corrosive material in Comparative Example 5 had a high viscosity, and resulted in a sealing member having an excessively large thickness. Such a sealing member caused difficulties in insertion of the wire into the connector housing.

The present invention has been described by way of Examples, but the present invention will not be limited to these, and can be modified in various ways within the scope of the gist of the present invention. The above-mentioned compounds, i.e., the monofunctional (meth)acrylate monomer, the bifunctional (meth)acrylate monomer, the trifunctional (meth)acrylate monomer, the polyfunctional (meth)acrylate monomer, and the photopolymerizable (meth)acrylate oligomer are only examples, and the present invention will not be limited by these compounds.

What is claimed is:

1. An anti-corrosive material comprising:
an ultraviolet curable resin comprising a polymerizable compound as a main component, the polymerizable compound being composed of at least one of a photopolymerizable (meth)acrylate monomer and a photopolymerizable (meth)acrylate oligomer, wherein
the polymerizable compound is composed of:
a first combination of a monofunctional (meth)acrylate monomer and a bifunctional (meth)acrylate monomer, or
a second combination of:
at least one of: a monofunctional (meth)acrylate monomer and a bifunctional (meth)acrylate monomer; and
at least one of a trifunctional (meth)acrylate monomer and a polyfunctional (meth)acrylate monomer having four or more functional groups,
the composition of the polymerizable compound with regard to the first combination or the second combination prevents an increase in a crosslinking density of a resulting cured product, and
the anti-corrosive material has a viscosity at 25° C. of 18900 mPa·s or less measured according to JIS Z8803.

2. A wire with a terminal, comprising:
a wire including a conductor and a wire covering member disposed over the conductor;
a metal terminal connected to the conductor of the wire; and
a sealing member formed by curing the anti-corrosive material according to claim 1, and covering a joint connecting the conductor and the metal terminal.

3. The wire with the terminal according to claim 2, wherein
the conductor includes an elemental wire formed of aluminum or an aluminum alloy, and
the metal terminal comprises copper or a copper alloy.

4. A wire harness comprising:
the wire with the terminal according to claim 2.

5. The anticorrosive material according to claim 1, wherein:
the monofunctional (meth)acrylate monomer comprises one of: isobornyl acrylate and ethoxylated phenyl acrylate; and
the bifunctional (meth)acrylate monomers comprises one of: 2-hydroxy-3-(acryloyloxy)propyl methacrylate and dipropylene glycol diacrylate.

6. The anticorrosive material according to claim 1, further comprising a photopolymerization initiator that accelerates curing of the ultraviolet curable resin with ultraviolet light.

7. The anticorrosive material according to claim 6, wherein the photopolymerization initiator comprises a compound that initiates a polymerization reaction of one of: the photopolymerizable monomer or the photopolymerizable oligomer.

8. The anticorrosive material according to claim 6, wherein the photopolymerization initiator is selected from the group consisting of: benzoin ether photopolymerization initiators, ketal photopolymerization initiators, acetophenone photopolymerization initiators, benzophenone photopolymerization initiators, and thioxanthone photopolymerization initiators.

9. The wire with the terminal according to claim 2, wherein the metal terminal comprises a female terminal including an electrical connection in an anterior portion thereof to be connected to a mating terminal and a wire connection in a posterior portion thereof to be connected to a leading end of the wire.

10. The wire with the terminal according to claim 9, wherein the electrical connection is box shaped and has a built-in spring to be engaged with the mating terminal.

11. The wire with the terminal according to claim 9, wherein the wire connection includes a conductor crimp portion in the anterior portion thereof and a covering member crimping portion in the posterior portion thereof.

12. The wire with the terminal according to claim 11, wherein the conductor crimp portion comprises a bottom plate and a pair of conductor crimping pieces that extend upright from both lateral sides of the bottom plate and bend inwardly so as to wrap the conductor of the wire thereby crimping the conductor such that the conductor is firmly pressed against a top surface of the bottom plate.

13. The wire with the terminal according to claim 11, wherein the covering member crimping portion in the posterior portion directly contacts the wire covering member at the leading end of the wire and comprises a bottom plate and a pair of covering member crimping pieces that extend upright from both lateral sides of the bottom plate and bend inwardly so as to wrap the wire covered with the wire covering member thereby crimping the wire covering member such that the wire covering member is firmly pressed against a top surface of the bottom plate.

14. The wire with the terminal according to claim 11, wherein a bottom plate of the conductor crimp portion and a bottom plate of the covering member crimping portion are continuously formed as a single bottom plate.

15. The wire with the terminal according to claim 11, wherein the joint connecting the conductor and the metal terminal are covered with the sealing member through a coating of the anti-corrosive material, the coating of the anti-corrosive material covering a part of a connection portion connecting the electrical connection and the wire connection across a boundary of the conductor crimp portion and a leading end of the conductor of the wire, and covering a part of the wire covering member across a boundary of the covering member crimping portion and the wire covering member.

16. The wire with the terminal according to claim 2, wherein the sealing member comprises the cured product formed by curing the anti-corrosive material, containing the ultraviolet curable resin with ultraviolet light.

17. The wire with the terminal according to claim 2, wherein the conductor comprises a tin-plated surface.

18. The wire with the terminal according to claim 2, wherein the wire covering member for covering the conductor comprises a resin material containing polyvinyl chloride (PVC) as a main component and olefin resins comprising one or more of: polyethylene (PE) polypropylene (PP), ethylene copolymer, and propylene copolymer.

19. The wire with the terminal according to claim 2, wherein the metal terminal comprises at least one of copper, a copper alloy, stainless steel, tin plated copper, a tin-plated copper alloy, tin-plated stainless steel, gold-plated copper, silver-plated copper.

* * * * *